/ United States Patent (12)
Moore et al.

(10) Patent No.: US 7,856,601 B2
(45) Date of Patent: Dec. 21, 2010

(54) DYNAMIC SERVICE PRESENTATION

(75) Inventors: Jason Fergus Moore, Redmond, WA (US); David George De Vorchik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1307 days.

(21) Appl. No.: 10/162,827

(22) Filed: Jun. 3, 2002

(65) Prior Publication Data
US 2003/0222897 A1 Dec. 4, 2003

(51) Int. Cl.
*G06F 3/048* (2006.01)
*G06F 3/00* (2006.01)

(52) U.S. Cl. .................. 715/809; 715/705; 715/714; 715/808; 715/838; 705/26; 705/27; 355/27

(58) Field of Classification Search ............. 715/705, 715/714, 838; 455/456.1, 422; 705/27, 26; 725/60; 358/1.15; 704/8–9; 348/207.11; 400/76
See application file for complete search history.

(56) References Cited

U.S. PATENT DOCUMENTS

| | | | | |
|---|---|---|---|---|
| 6,230,168 B1* | 5/2001 | Unger et al. | ............. | 715/501.1 |
| 6,252,589 B1* | 6/2001 | Rettig et al. | ................ | 715/703 |
| 6,453,361 B1* | 9/2002 | Morris | ........................ | 709/250 |
| 6,606,603 B1* | 8/2003 | Joseph et al. | .................. | 705/26 |
| 6,619,868 B2* | 9/2003 | Ishida | ......................... | 400/76 |
| 6,623,529 B1* | 9/2003 | Lakritz | ....................... | 715/205 |
| 6,657,702 B1* | 12/2003 | Chui et al. | .................... | 355/40 |
| 6,659,662 B2* | 12/2003 | Grohs | ......................... | 400/76 |
| 6,665,083 B1* | 12/2003 | Nakajima et al. | .......... | 358/1.15 |
| 6,678,889 B1* | 1/2004 | Burkett et al. | ................ | 718/104 |
| 6,784,925 B1* | 8/2004 | Tomat et al. | ........... | 348/207.11 |
| 7,142,317 B2* | 11/2006 | Naito et al. | ................. | 358/1.15 |
| 2002/0087601 A1* | 7/2002 | Anderson et al. | ............ | 707/515 |
| 2002/0087622 A1* | 7/2002 | Anderson | .................... | 709/203 |
| 2002/0089534 A1* | 7/2002 | Siekmann | .................... | 345/738 |
| 2002/0103813 A1* | 8/2002 | Frigon | ...................... | 707/104.1 |
| 2002/0186402 A1* | 12/2002 | Jackson et al. | ............. | 358/1.15 |
| 2002/0188612 A1* | 12/2002 | Yu et al. | ...................... | 707/100 |
| 2003/0040974 A1* | 2/2003 | Chauvin et al. | ............... | 705/26 |
| 2003/0069801 A1* | 4/2003 | Che-Mponda et al. | ........ | 705/26 |

OTHER PUBLICATIONS www.microsoft.com, "Print and share photos with Windows XP", Nov. 1, 2002, Http://www.microsoft.com/windowsxp/using/digitalphotography/videos/emailpics.mspx, pp. 1-3.*
www.livingroom.org, "Online photo printing", Sep. 14, 2004 Http://www.livingroom.org.au/photolog/tips/online_photo_printing.php, pp. 1-4.*
IETF.org et al. "RFC3066" Jan. 2001.*
Tidwell, D., "Project Report: IBM's TaskGuide: An XML-Based System for Creating Wizard-Style Helps," *Theory & Practice* 1(3):23-39, 1999.

* cited by examiner

*Primary Examiner*—Steven B Theriault
(74) *Attorney, Agent, or Firm*—Shook, Hardy & Bacon L.L.P.

(57) ABSTRACT

A method is provided for exchanging an organizational scheme, such as a tag-based structural framework, that can be applied to data describing and containing information relating to Web service providers to facilitate creating, updating, and interpreting the data so that Web service providers are suitably presented to a user, depending on the user's country, language, locale, and the availability of Web service providers.

20 Claims, 13 Drawing Sheets

DYNAMIC SERVICE PRESENTATION

FIELD OF THE INVENTION

The present invention relates generally to a method for dynamically exchanging and presenting information relating to Web service providers, and more particularly, to the exchange of an organizational scheme, which is formed from a customizable, tag-based language, that can describe and contain data to facilitate creating, updating, or interpreting the data such that the presented Web service providers are suitable to a user's country, language, and locale.

BACKGROUND OF THE INVENTION

FIG. 1 illustrates an interactive help utility called a wizard 100, which appears as a modal window, within an application. The wizard generates windows that guide a user through each step of a particular task, such as starting up a word processing document in the correct format for a business letter. The GUI window of the wizard 100, like other window applications, includes a title bar 102, which is a horizontal space at the top of a window that contains the name of the window. Appearing as a square button in the right corner of the title bar 102 with an X mark on it is a close button 104. Clicking on the close button 104 cancels the wizard 100. The wizard 100 also includes a number of sequential screens 106, 108, and 110 that present information and receive input (information) from a user during the performance of the task defined by the wizard. The screens 106-110 may be navigated back and forth using a back button 112 or a next button 114. After collecting sufficient information from a user, the wizard 100 presents a finish button 115. A user clicking the finish button causes the wizard 100 to proceed to perform the wizard's task. At any point, a user may exit from the wizard 100 by clicking on a cancel button 116. Clicking on the cancel button causes the wizard 100 to quit and returns the user to the application that originally invoked the wizard 100.

Wizards and similar programs typically present a set of choices from which a user selects to accomplish a particular task. This works fine as long as the choices are static, but can become unfeasible when the choices are dependent on a number of factors, such as a user's country, language, and locale. For example, suppose a software manufacturer designs a wizard to help a user print electronic photographic images by presenting a list of service providers available to a user via a wide area network such as the Internet (hereafter Web Server providers) so that the user, who may be located in Seattle, Washington, for example, may choose to obtain high quality prints from his images. Between the time that a software manufacturer produces a wizard with a fixed list of Web service providers and the time that a user uses the wizard to help him obtain prints, one or more of the Web service providers in the list may no longer be in business. Thus, the information that is contained in a wizard may become irrelevant. When a user selects a Web service provider that no longer exists, the user's computing experience is frustrated and he may no longer trust information that is presented to him.

Another problem is the expense that a software manufacturer has to commit to localize a wizard to make it appropriate for the country, language, and locale of a user. In other words, a wizard that presents a list of Web service providers who can communicate in English is helpful to a user who is in Seattle, Wash., but is rather unhelpful to a non-English communicating user who is located in China or Saudi Arabia. Even if a software manufacturer has a sufficient engineering budget to localize a wizard to any country in which the wizard may be used, certain Web service providers, while active and available for business in one country, may be unavailable or unlicensed to operate in another country.

A partial solution is provided by a system 200, as shown in FIG. 2, that breaks a wizard into components so that when a wizard's functionality requires augmentation or updating, it can be easily changed. The system 200 includes multiple servers 208-212, that contribute one or more wizard components or wizard pages 106-110 to create a wizard. The assembly process to produce a wizard, in accordance with the system 200, is driven and controlled from a script file 202. Each wizard component 208-212 can be written in any language. The assembly process of a wizard begins when the script file 202 is loaded into a wizard engine 206. The wizard engine 206 parses the script file 202 to find the location(s) of the wizard components, which are located on servers 208-212. The wizard engine 206 is executed on a computer 204. Whereas changes made to the wizard 100 require re-design, re-compilation, and re-testing of the wizard 100, only those components that are affected by changes need to be re-designed in a wizard assembled by the system 200. Thus, if a Web service provider is no longer a going concern, a component that displays a list of Web service providers can be changed in the system 200 while other components remain the same. However, because of the amount of time required to re-design, re-compile, and re-test the affected components, an assembled wizard by the system 200 may not necessarily reflect further changes in the availability of Web service providers.

Instead of using the script file 202 to assemble a wizard from multiple components, another way to create a wizard is to use a markup language, such as extensible markup language (XML), without writing, compiling, and debugging code, as illustrated by a system 300 shown in FIG. 3. An XML file 302 contains customized tags that allow non-programmers to create portions of a wizard such as: the title bar 102; the close button 104; the screen 106; the back button 112; the next button 114; and the cancel button 116. An interpreter 304 receives and parses the XML file 302 to immediately render a wizard in accordance with the customized tags contained in the XML file 302. While a significant advance over compiled wizards, the system 300 provides no facility to create a wizard that is suitable to a user's country, language, locale.

Thus, there is a need for a method and a system for exchanging dynamic information, which is formed from a customizable, tag-based language, that can describe and contain data to facilitate creating, updating, or interpreting the data such that the presented Web service providers are suitable to a user's country, language, and locale, while avoiding the foregoing and other problems associated with existing wizards and similar programs.

SUMMARY OF THE INVENTION

In accordance with this invention, a method is provided for exchanging information to obtain a collection of Web service providers for a utility, such as a wizard, and showing the Web service providers on a display so that a user can select a Web service provider using a selection device. To begin, the utility issues a request to a resource located on the Internet for a data structure that describes the collection of Web service providers. The data structure can be formed by any customizable, tag-based organizational scheme, such as extensible markup language (XML).

Along with the request for the data structure, the utility also issues an identification of the geographic region associated with the operating system with which the user is interacting. The operating system is the foundation software of a computing device on which applications depend and typically it is associated with the geographic region in which the device the user is operating is located. Thus, the identification of the geographic region associated with the operating system also identifies the geographic locale of the user. This aspect of the invention allows the data structure that describes the collection of Web service providers to be tailored specifically to the user's country, language, locale, and even to the available Web service providers in the identified geographic region.

When the resource, which is located on a wide area network, such as the Internet, receives the request for the data structure that describes the collection of Web service providers, the resource parses the request to retrieve the geographic region identification information. Based on the geographic region identification information, the resource issues to the utility the data structure containing information regarding the collection of Web service providers that are suitable and available for the geographic region associated with the user's operating system. Because the user through the utility pulls dynamically updated information relating to the collection of Web service providers from the resource, any changes to the suitability or the availability of a Web service provider are immediately reflected in the information issued by the resource. Thus, a user is unlikely to be presented with information that has become irrelevant resulting in the user's computing experience being smoother and more trustworthy.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
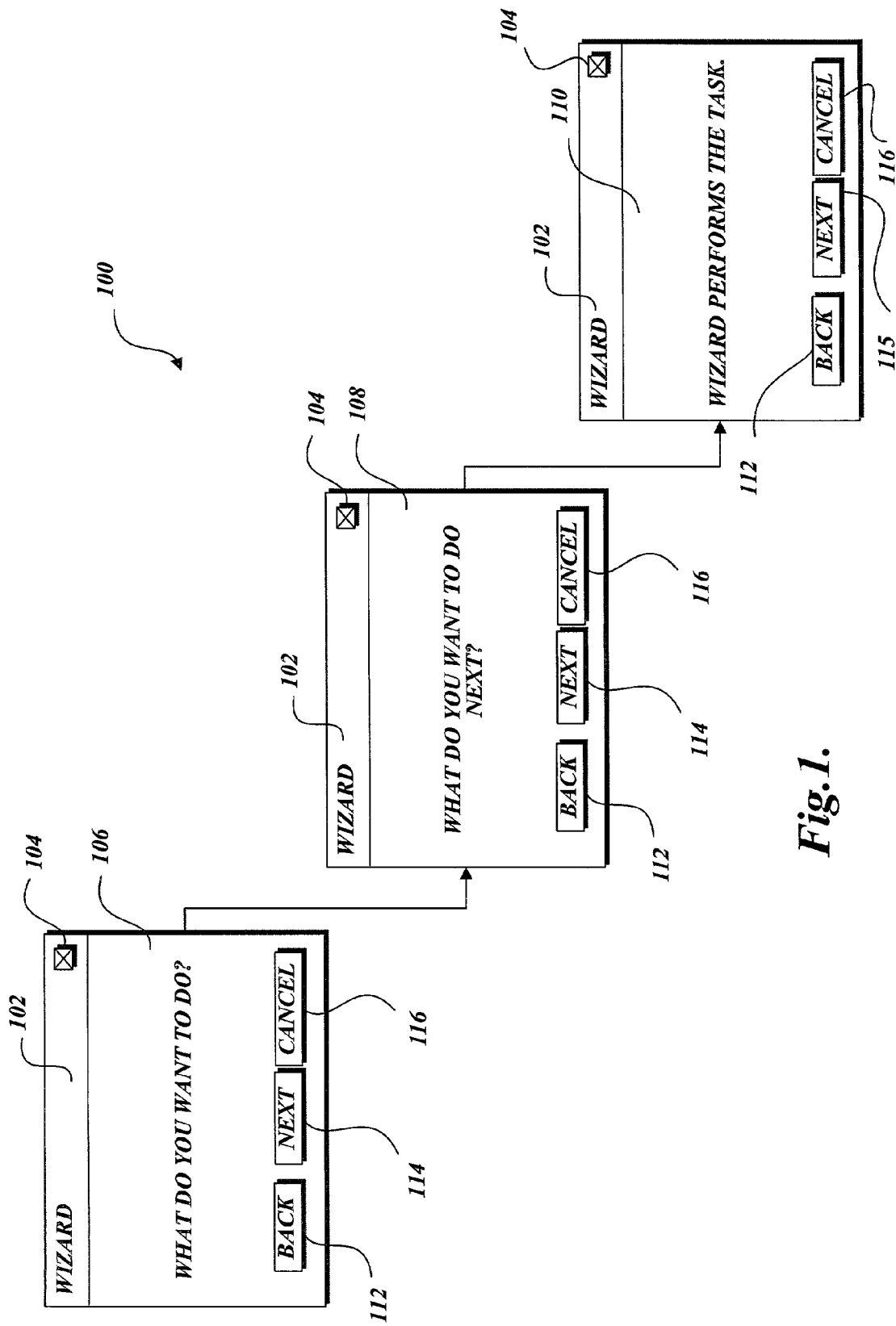
FIG. 1 is a block diagram illustrating a number of screens of a conventional wizard, which is an interactive help utility that guides a user through each step of a particular task.
Figure 2:
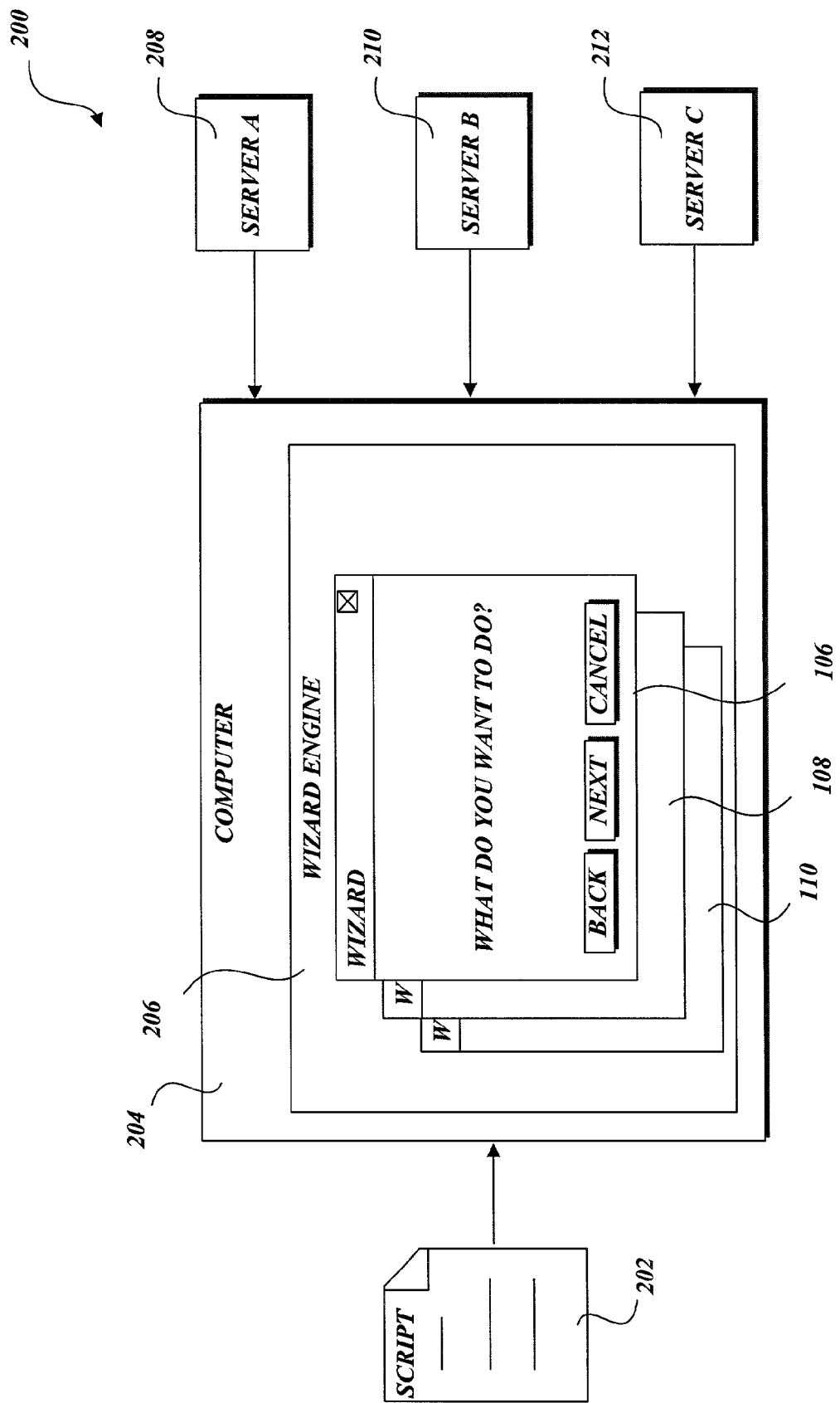
FIG. 2 is a block diagram illustrating a conventional system for assembling a wizard using components and a file script.
Figure 3:
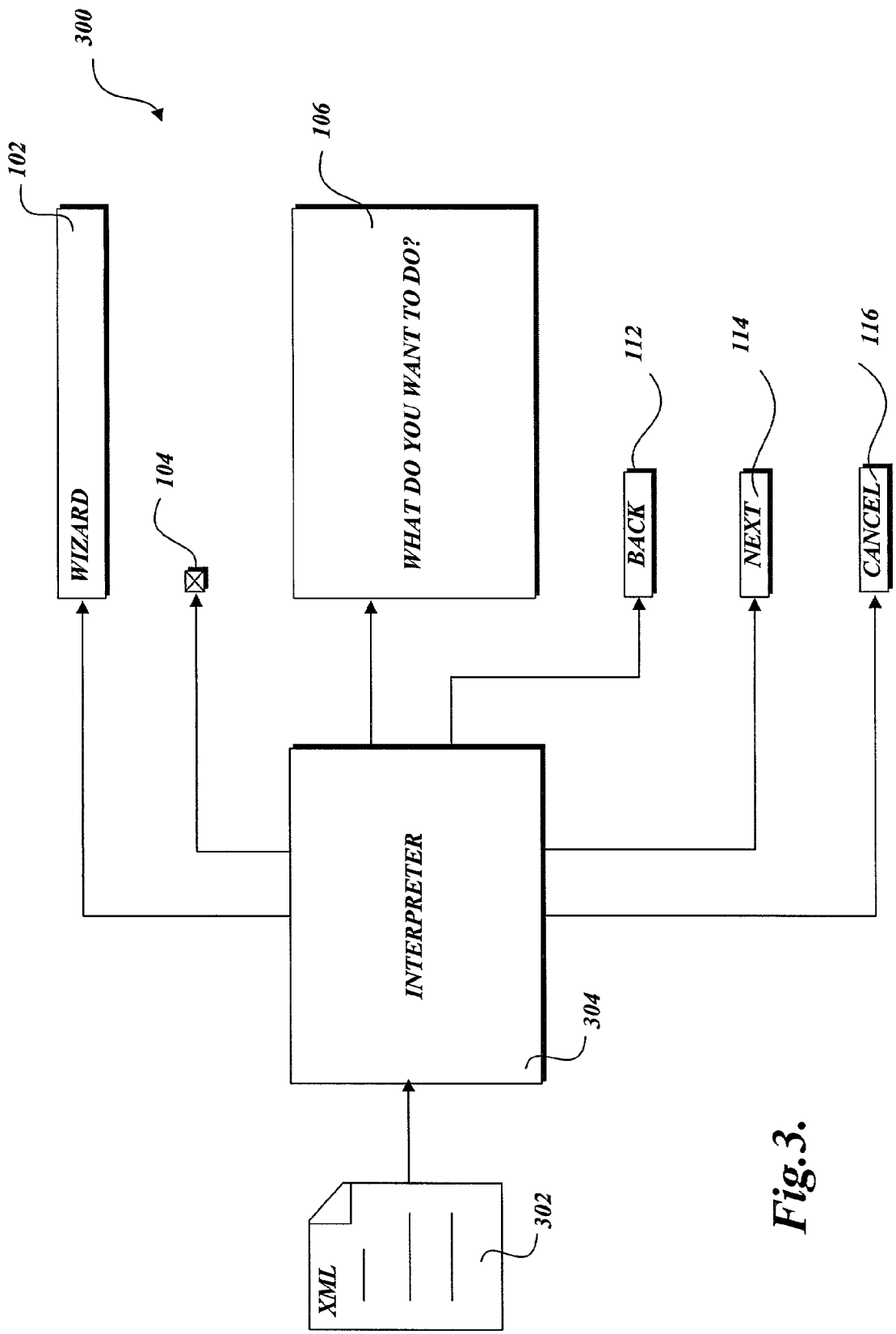
FIG. 3 is a block diagram illustrating a conventional system for a non-programmer to create a wizard by specifying portions of the wizard using an extensible markup language (XML) file and the interpretation of such a file by an interpreter.
Figure 4:
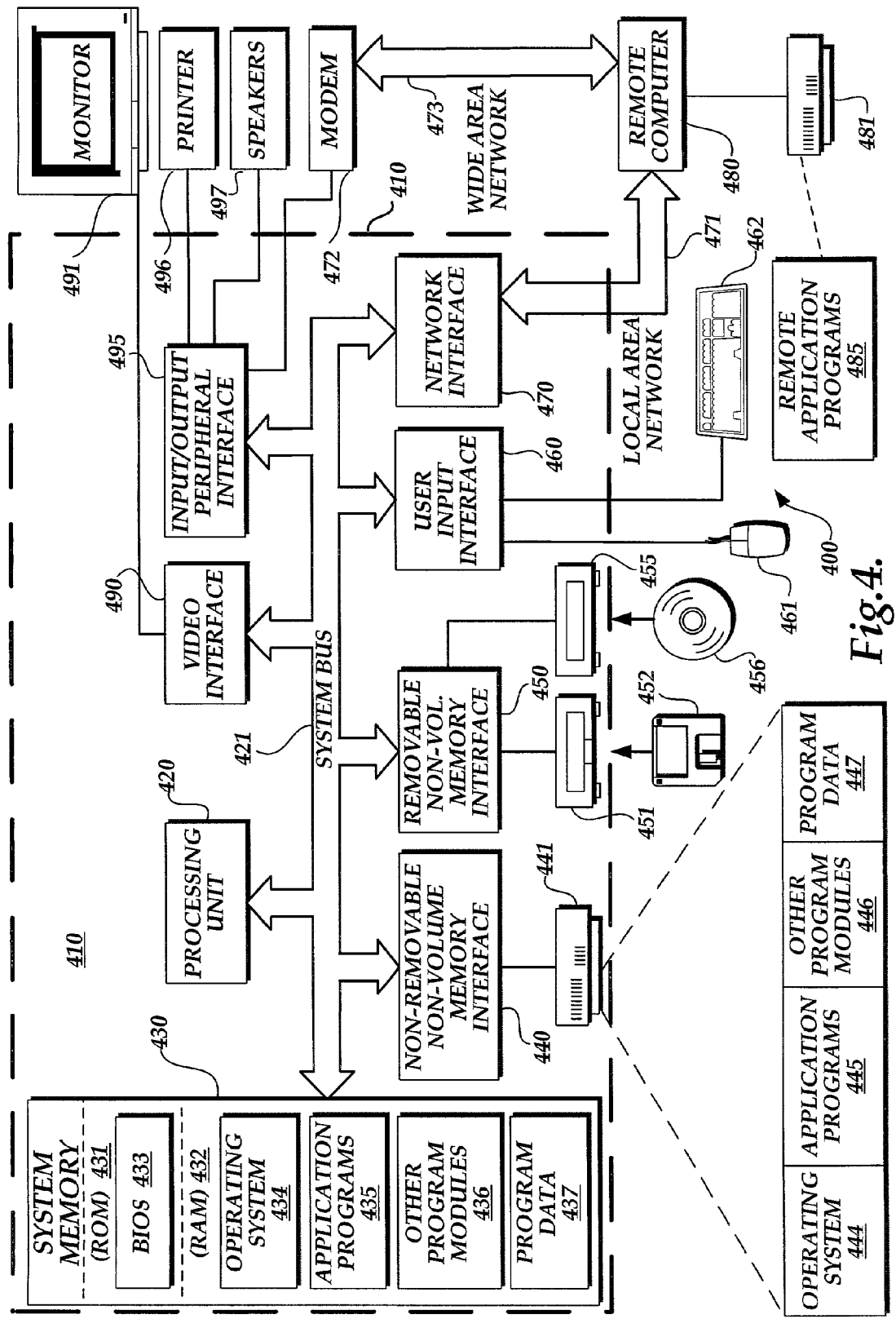
FIG. 4 is a block diagram illustrating an exemplary computing device.

FIG. 4 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to, any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc., that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

With reference to FIG. 4, a system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standard Association (VESA) local bus, and Peripheral Component Interconnect (PCI) bus, also known as Mezzanine bus.

Computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embodies computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF infrared and other wireless media. A combination of any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible and/or presently being operated on, by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates the hard disk drive 441 that reads from or writes to non-removable, nonvolatile magnetic media, the magnetic disk drive 451 that reads from or writes to a removable, nonvolatile magnetic disk 452, and an optical disk drive 455 that reads from or writes to a removable, nonvolatile optical disk 456, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 441 is typically connected to the system bus 421 through a non-removable memory interface, such as interface 440, and the magnetic disk drive 451 and optical disk drive 455 are typically connected to the system bus 421 by a removable memory interface, such as interface 450.

The drives and their associated computer storage media discussed above and illustrated in FIG. 4 provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices, such as a keyboard 462 and pointing device 461, commonly referred to as a mouse, trackball, or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port, or universal serial bus (USB). A monitor 491 or other type of display device is also connected to the system bus 421 via an interface, such as a video interface 490. In addition to the monitor, computers may also include other peripheral output devices, such as speakers 497 and printer 496, which may be connected through an input/output peripheral interface 495.

The computer 410 may operate in a networked environment using logical connections to one or more remote computers, such as a remote computer 480. The remote computer 480 may be a personal computer, a server, a router, a network PC, a peer device, or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such network environments are commonplace in offices, enterprise-wide computer networks, intranets, and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the input/output peripheral interface 495, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are for illustrative purposes only and other means of establishing a communications link between the computers may be used.

The problems discussed hereinbefore in the Background of the Invention are overcome and/or reduced by a wizard 500 (FIG. 5), which is provided by the invention, having the ability to dynamically exchange information relating to service providers available to a user with a wide area network such as the Internet (hereinafter Web service providers) that are appropriate and suitable depending on the user's country, language, and locale. The wizard 500 is used here only as an example and other similar programs, such as other utilities, that help a user to accomplish tasks can also benefit from the various embodiments of this invention.

Figure 5:
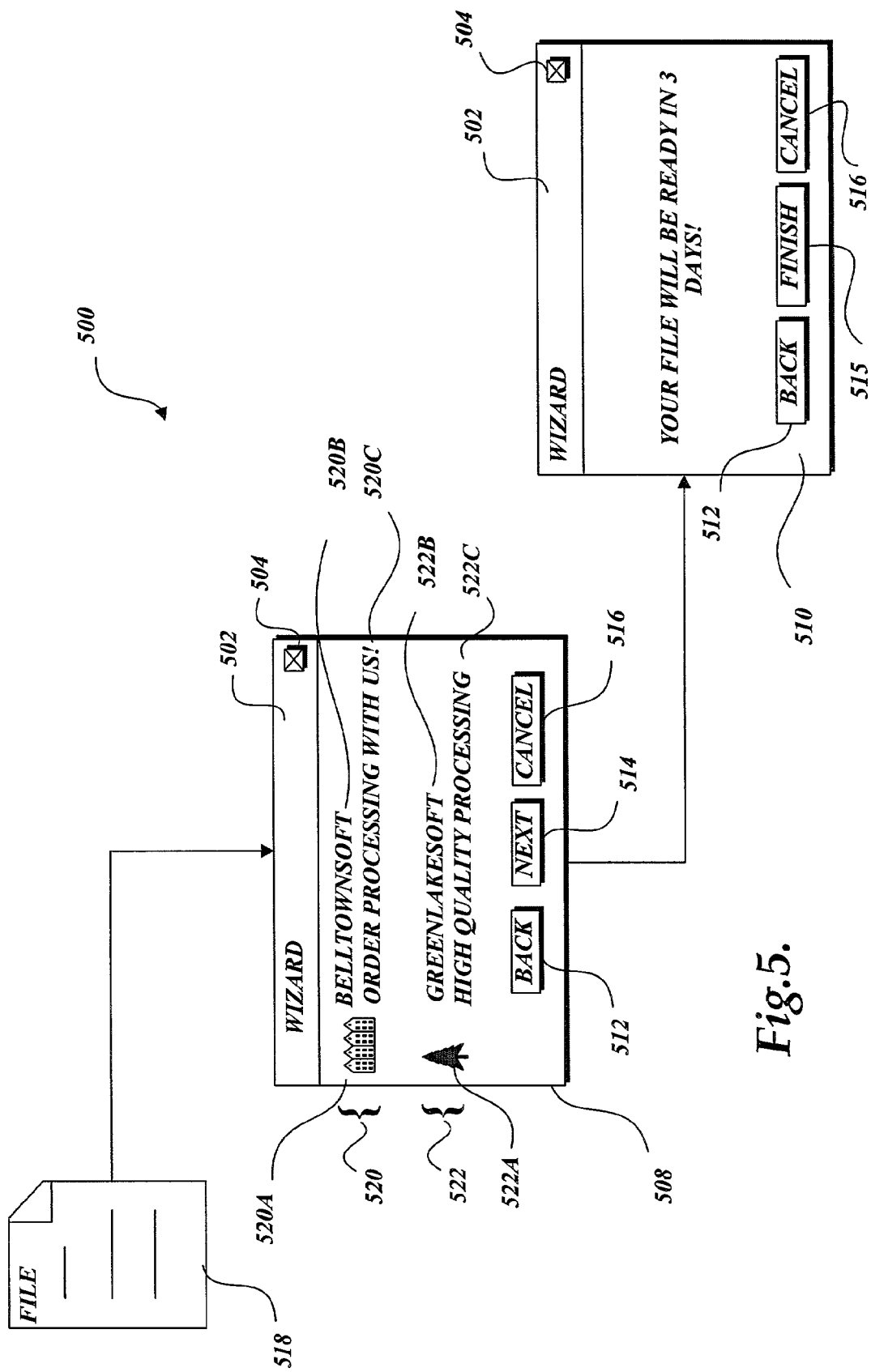
FIG. 5 is a block diagram illustrating a number of screens of a wizard that has the ability to exchange information with a resource to obtain a collection of Web service providers suitable and appropriate to a user's country, language, and locale, according to one embodiment of the present invention.

The wizard 500, as illustrated in FIG. 5, like other window applications, includes a title bar 502 that contains the name of the window and is preferably located horizontally at the top of a window. In the right corner of the title bar 502 with an X mark inside a square button is a close button 504. When activated, such as by clicking on the close button 504, the wizard 500 is canceled. A number of screens, 508, 510 of the wizard 500 present information, such as a list of Web service providers 502, 522, and receive input (information) from a user, such as a selection of a particular Web service provider, during the performance of the task defined by the wizard 500. The wizard 500 includes a set of navigation facilities, which at a minimum include a Next button 514. A Back button 512 or the Next button 514 may be used by the user to navigate back and forth between screens 508, 510. A Cancel button 516 behaves similarly when a user clicks upon the close button 504 to cancel the wizard 500 even if a user is in the midst of a task. When sufficient information is collected from a user, the wizard 500 makes visible a Finish button 515. A user clicking the Finish button 515 causes the wizard 500 to proceed to perform the wizard's task, such as bringing a user to a first Web page of a selected Web service provider.

Prior to invoking the wizard 500, a file 518, which is a complete, named collection of information, such as a user-created document containing an image, a piece of music, or other data type, is selected. Next, a user chooses a task presented by a user interface of an operating system. In response, a suitable utility, such as the wizard 500, becomes active to analyze the file 518 and communicate with a resource (not shown) to obtain a list of Web service providers 520, 522, that can provide a desired service to process the file 518. The information obtained from the resource includes logos, symbols, or icons 520A, 522A that distinctly identify Web service providers; display names or word marks 520B, 522B that textually identify Web service providers; and additionally, descriptions or advertisement copies 520C, 522C that textually describe and express the services provided by these Web service providers. Because the wizard 500 pulls information relating to Web service providers 520, 522 from the resource just prior to the instance that the screen 508 of the wizard 500 is presented to the user, the information relating to Web service providers 520, 522 is fresh, with a low probability that one of these Web service providers is no longer in business or suitable for use by the user. Moreover, the symbols 520A, 522A; word marks 520B, 522B; and advertisement copies 520C, 522C are given appropriate visual and linguistic presentation depending on a user's country, language, and locale. The technique of how that is accomplished will be further discussed below.

Examples of tasks performed by the wizard 500 and similar programs are many. They include tasks that present Web services for ordering prints of pictures or images; Web services for publishing a file of any data type to a Web site; and Web services for creating shortcuts to share folders or resources on a Network, a Website or server. These Web services and tasks as discussed here are for illustrative purposes only. The invention can be practiced to present Web service providers to provide services relating to many other tasks not necessarily discussed here for brevity purposes.

Figure 6:
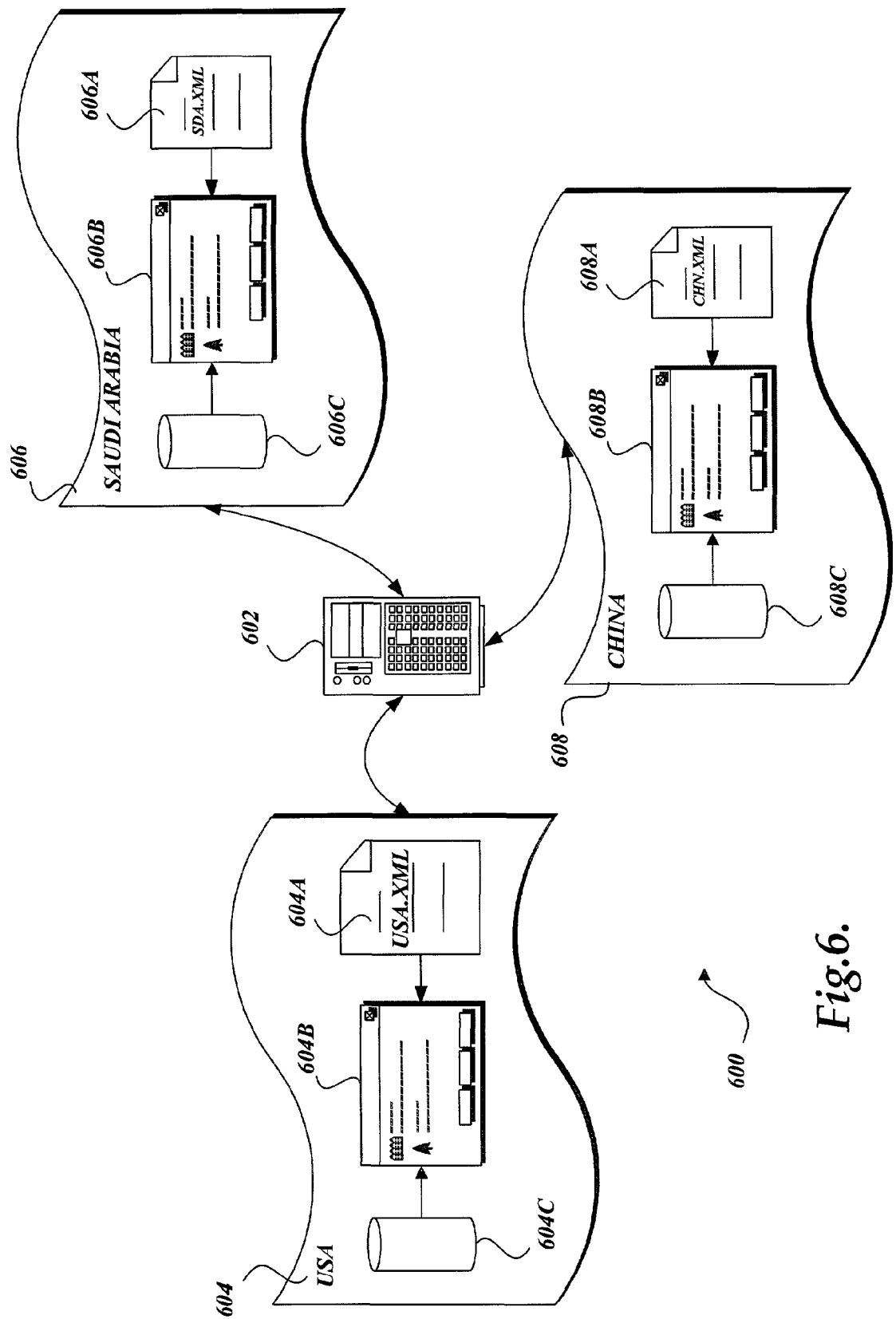
FIG. 6 is a block diagram illustrating pieces of a system for exchanging Web service provider information, and particularly, a resource containing one or more customizable, tag-based files; a wizard being executed on an operating system in a first geographic location; a wizard being executed on an operating system in a second geographic location; and yet another wizard being executed on an operating system in a third geographic location, according to one embodiment of the present invention.

A remote resource 602 located on the Internet, which has been alluded to in the above discussion, is shown in FIG. 6. A number of wizards 604B-608B, each of which can access the resource 602 via the Web to exchange information so that each wizard can display a collection of Web service providers that are appropriate and suitable for the geographic region in which wizards 604B-608B are being used as shown in FIG. 6. For example, the wizard 604B is being executed on an operating system, such as Microsoft Windows®, residing in a computing device located in the United States of America (USA); the wizard 606B is being executed on an operating system 606 in Saudi Arabia; and the wizard 608B is being executed on an operating system 608 such as Microsoft Windows®, residing in a computing device located in China. Each operating system 604-608 contains information regarding the geographic region in which the operating system is being used. For instance, the wizard 604B can query the operating system 604 to obtain an identification of the associated geographic region and convert the identification to a 3-letter country code (e.g., USA). When the wizard 604B is ready to exchange information with the resource 602 to obtain a collection of Web service providers, the wizard 604B issues a request for such information to the resource 602 along with the three-letter country code. In response to such a request, the resource 602 parses the request from the wizard 604B to obtain the identification of the geographic region. The resource 602 then searches its store of customizable, tag-based data structures for a data structure having a name that matches the identification of the geographic region given to the resource 602 by the wizard 604B. More particularly, the nomenclature of each data structure stored in the resource 602 comprises a base with a suffix. By matching the base, which, in this example, comprises three letters, of the name of a data structure to the identification, which also comprises three letters, of a geographic region, the resource 602 can readily identify a data structure that contains information regarding Web service providers that are appropriate and suitable for the identified geographic region. The found data structure 604A (e.g., USA.XML) is returned or issued from the resource 602 back to the wizard 604B. The suffix XML in this example identifies that the data structure is formed using extensible markup language. However, any customizable, tag-based language may be used and the invention is not limited to XML data structures. Upon receiving the data structure 604A, the wizard 604B parses the data structure 604A to obtain and present a collection of Web service providers to the user, such as those Web service providers 520, 522 shown in FIG. 5.

Similarly, the wizard 606B can exchange an identification regarding the Saudi Arabia geographic region with the resource 602 to obtain a data structure 606A. The data structure 606A may contain the same list of Web service providers as contained in the data structure 604A but it need not be so. Moreover, the information regarding the Web service providers in the data structure 606A is appropriate to a user of the language of Saudi Arabia or variations thereof. Analogously, the wizard 608B can obtain from the resource 602 a data structure 608A containing information relating to Web service providers appropriate to the Chinese language, country, or locale.

Each of the data structures 604A-608A is formed from a customizable, tag-based language, which is human readable, updateable, and maintainable at the resource 602. Programming code is typically difficult to understand. Because software update engineering cycles are long, they are difficult to use to update changes in the availability or suitability of Web service providers. Moreover, because Web service providers, as businesses, may appear or disappear as going concerns, the ability of the resource 602 to manage, update, and centrally distribute information eases the ability to keep information relevant to users. Web service providers can be added, deleted, or changed over time by simply updating the data structures stored or made accessible by the resource 602. Knowing the geographic region of a user is valuable to Web service providers who wish to tailor specific messages and experiences to the user via the information in the data structures 604A-608A. These identities of geographic regions essentially provide a skeleton used by data structures at the resource 602 as a supportive structure or framework in which to shape or to call user's attention to use a Web service providers' services. Additionally, the identities of geographic regions allow Web service providers to be language sensitive and thereby better market to specific language users and to provide experiences in areas of demands for which there are opportunities.

After selecting a particular Web service provider from a list presented by the wizard 604B, the information that comprises the selected Web service provider is stored in a central hierarchical database 604C of the operating system 604. For example, if the selected Web service provider is the Web service provider 520 as illustrated in FIG. 5, the symbol 520A, the word mark 520B, and the advertisement copy 520C, and the address on the Internet at which the Web service provider 520 is located, is stored in the central hierarchical database 604C. The central hierarchical database 604C is typically used in an operating system to store information necessary to configure this operating system for one or more users, applications, and hardware devices. The central hierarchical database 604C contains information that the operating system 604 continually references during operation, such as profiles for each user, the applications installed on the computer, the types of documents each user can create, property sheet settings for folders and application icons, what hardware exists on the system, and which ports are being used, among other things. One example of the central hierarchical database 604C is the Registry used in Microsoft Windows, but other suitable databases can also be used.

The information relating to the selected Web service provider, such as the Web service provider 520, can be stored in the central hierarchical database 604C using any suitable structural layout. One suitable layout includes a tree structure, where the wizard 604B is at a root node, and a first node nested below the root contains the word mark 520B, and other nodes underneath the first node correspondingly include the symbol 520A, the advertisement copy 520C, and the address where the Web service provider 520 may be located on the Internet. By storing away information related to the selected Web service provider, the next time the user is presented with the list of Web service providers, the wizard 604B can use the stored information in the central hierarchical database 604C to highlight a Web service provider from the list to indicate to the user that the highlighted Web service provider was previously selected and may be favored by the user.

The central hierarchical database 604C can be used by an original equipment manufacturer or other manufacturers to store information about Web service providers that may not be available from the resource 602. In this way, the invention allows greater flexibility to present other Web service providers to a user whether the information regarding those providers is coming from the Web or locally stored on the central hierarchical database 604C.

The foregoing discussion has been focused on the operating system 604, the data structure 604A, the wizard 604B, and the central hierarchical database 604C. However, the general principles of such a discussion equally apply to operating systems 606, 608; data structures 606A, 608A; wizards 606B, 608B; and central hierarchical databases 606C, 608C.

Figure 7:
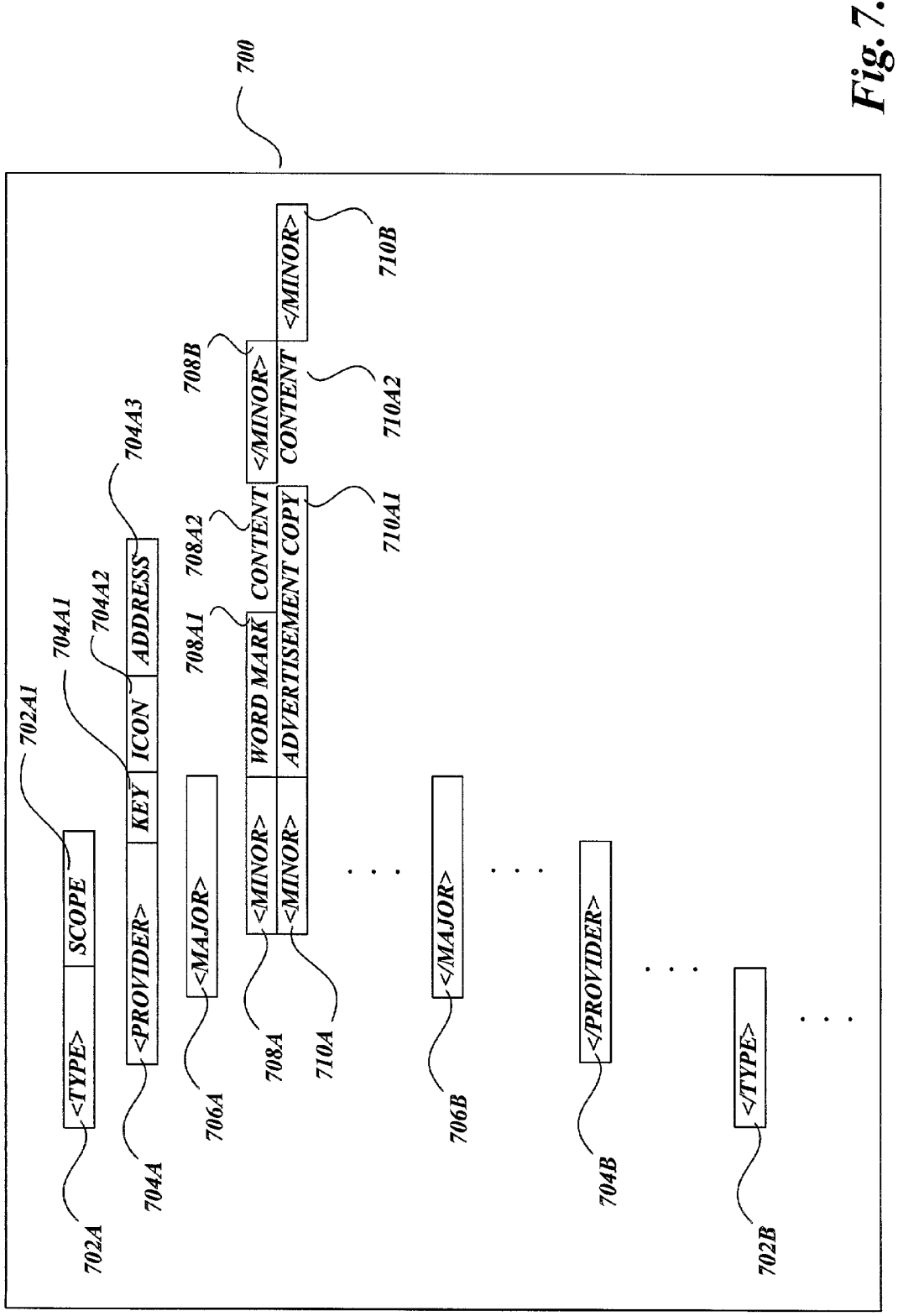
FIG. 7 is a structured diagram illustrating a customizable, tag-based data structure, such as an extensible markup language (XML) data structure, that is organized to describe and contain information relating to Web service providers, according to one embodiment of the present invention.
Figure 8A:
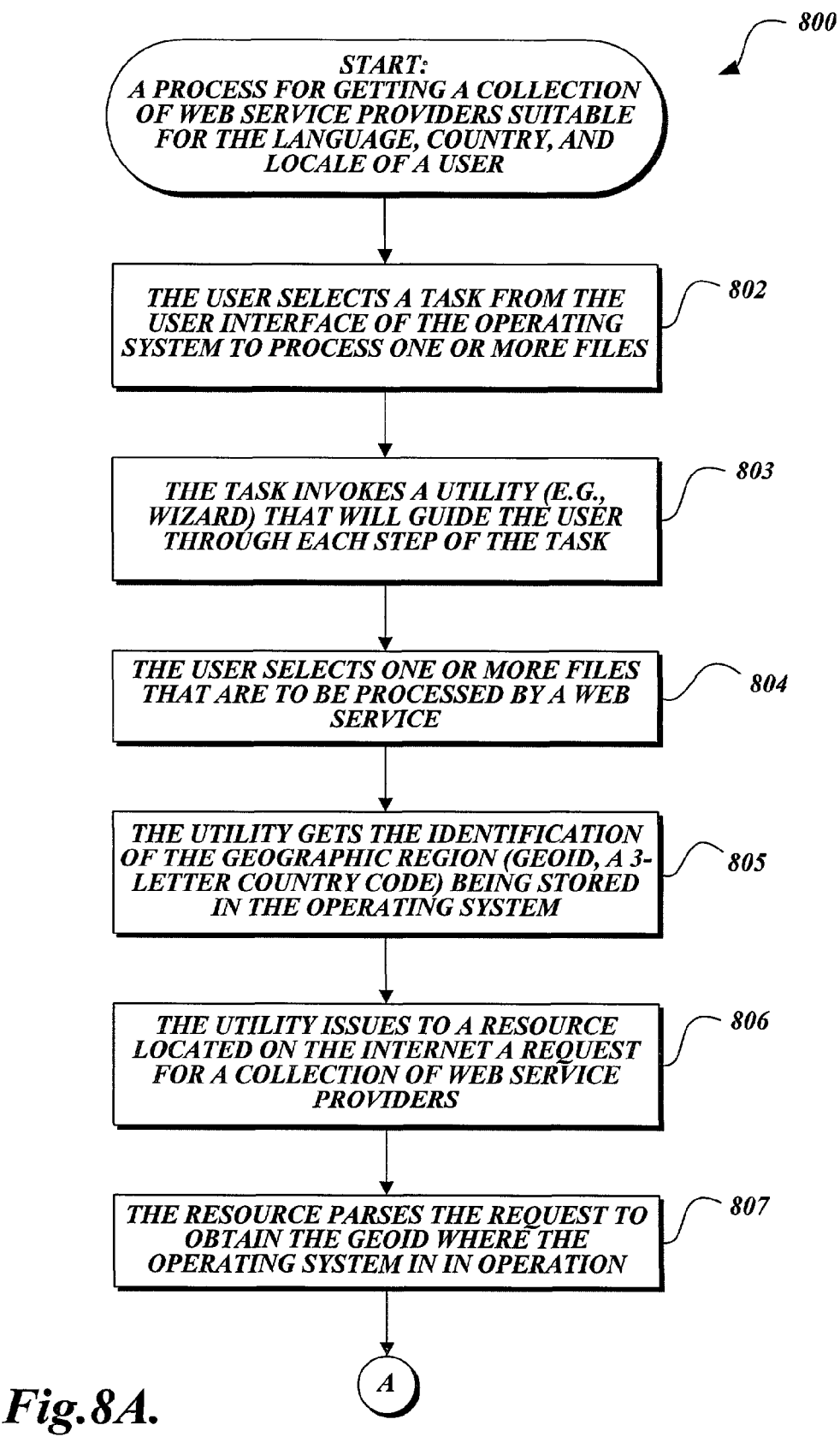
FIGS. 8A-8F are process diagrams illustrating a protocol for exchanging an organizational scheme, such as a customizable, tag-based file describing and containing information relating to Web service providers, according to one embodiment of the present invention.
Figure 8B:
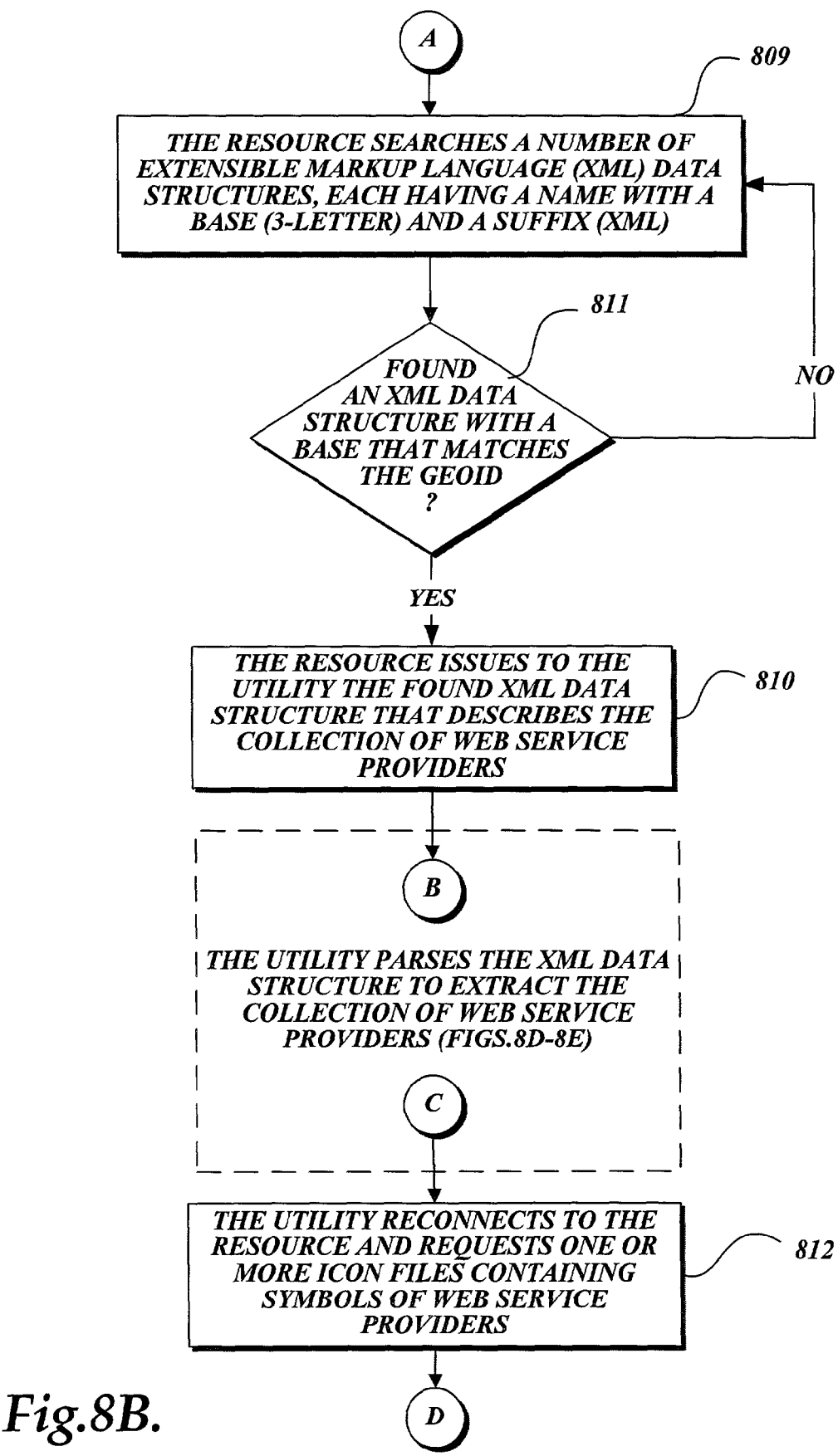
Figure 8C:
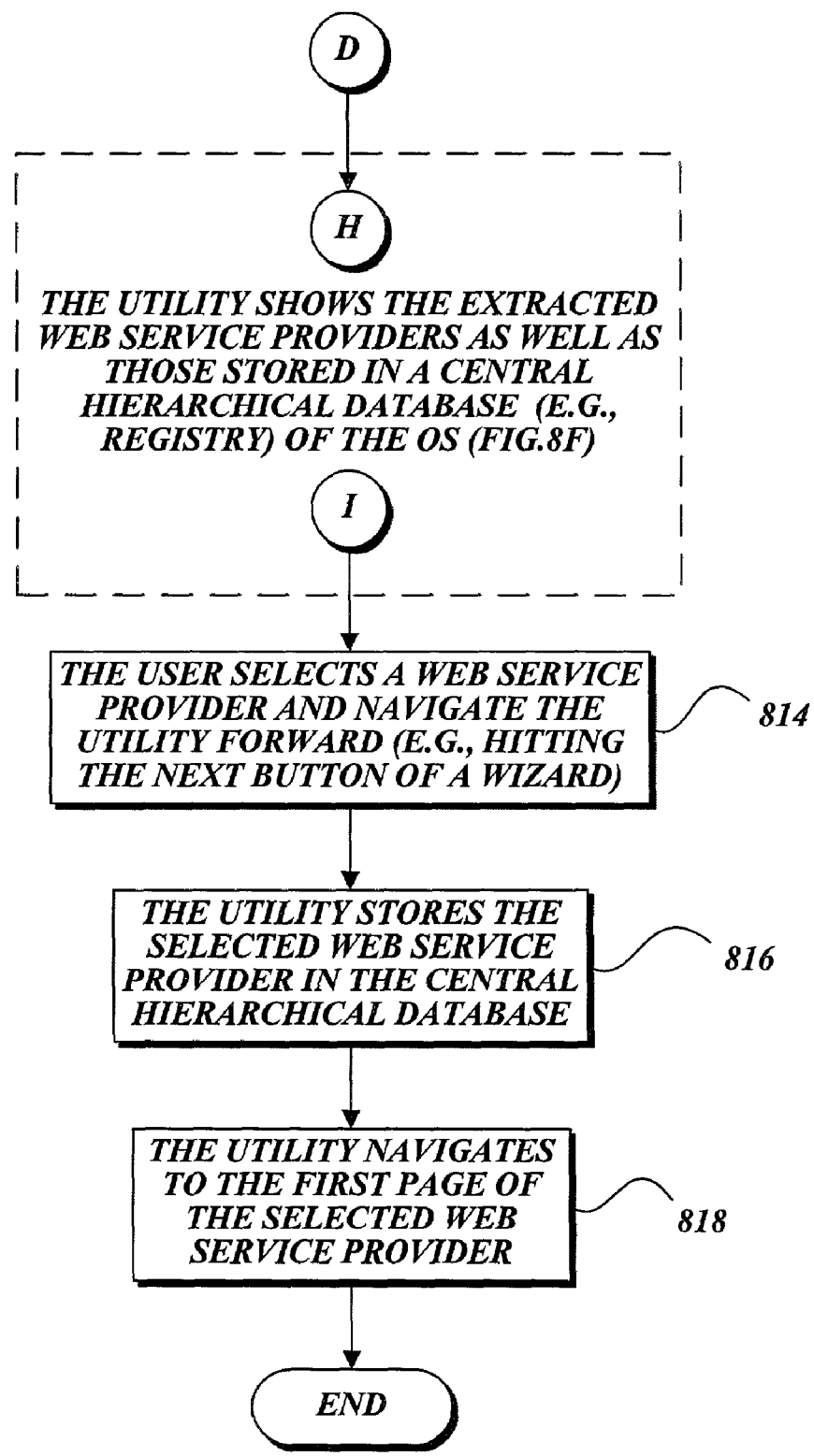
Figure 8D:
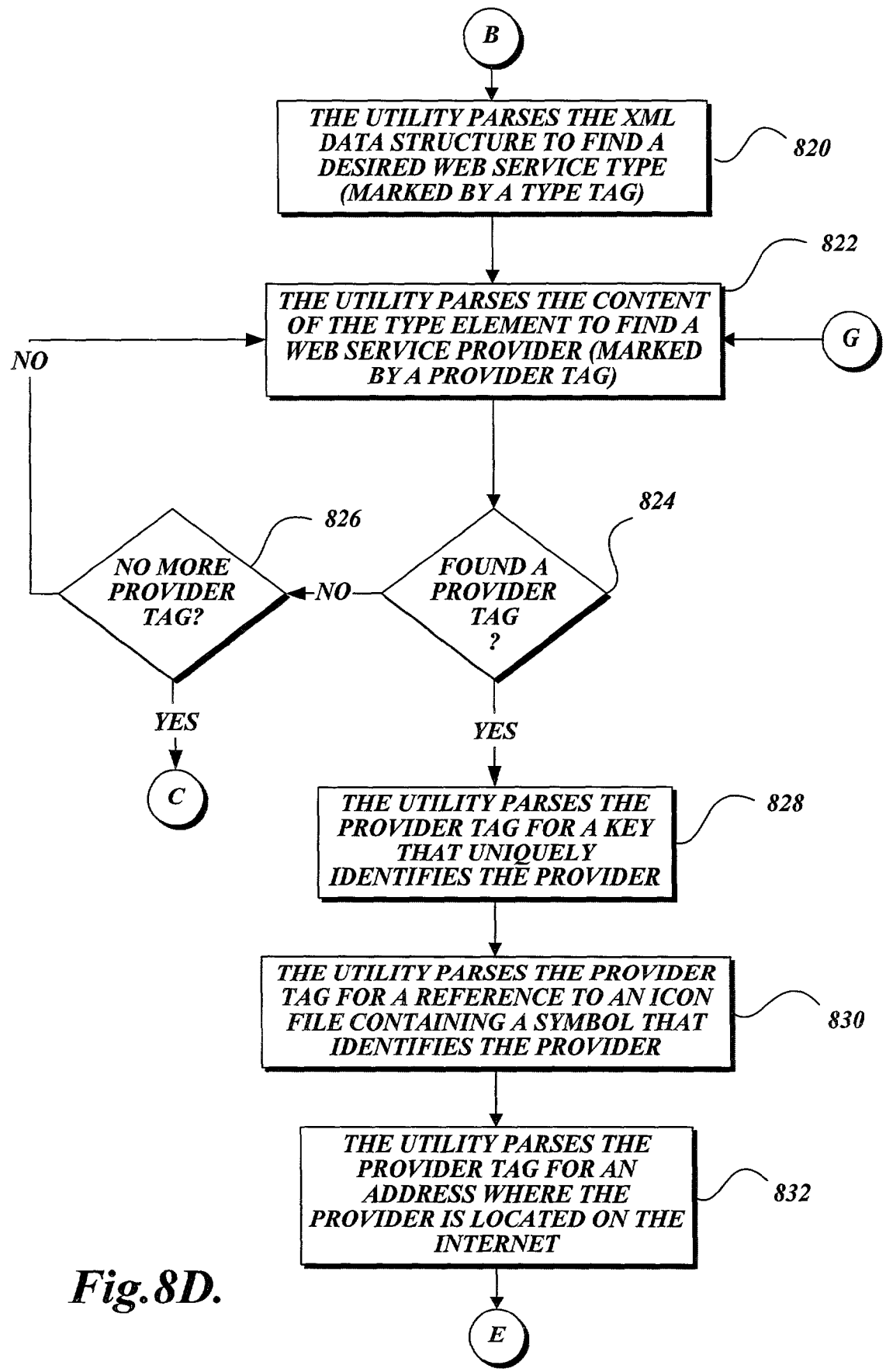
Figure 8E:
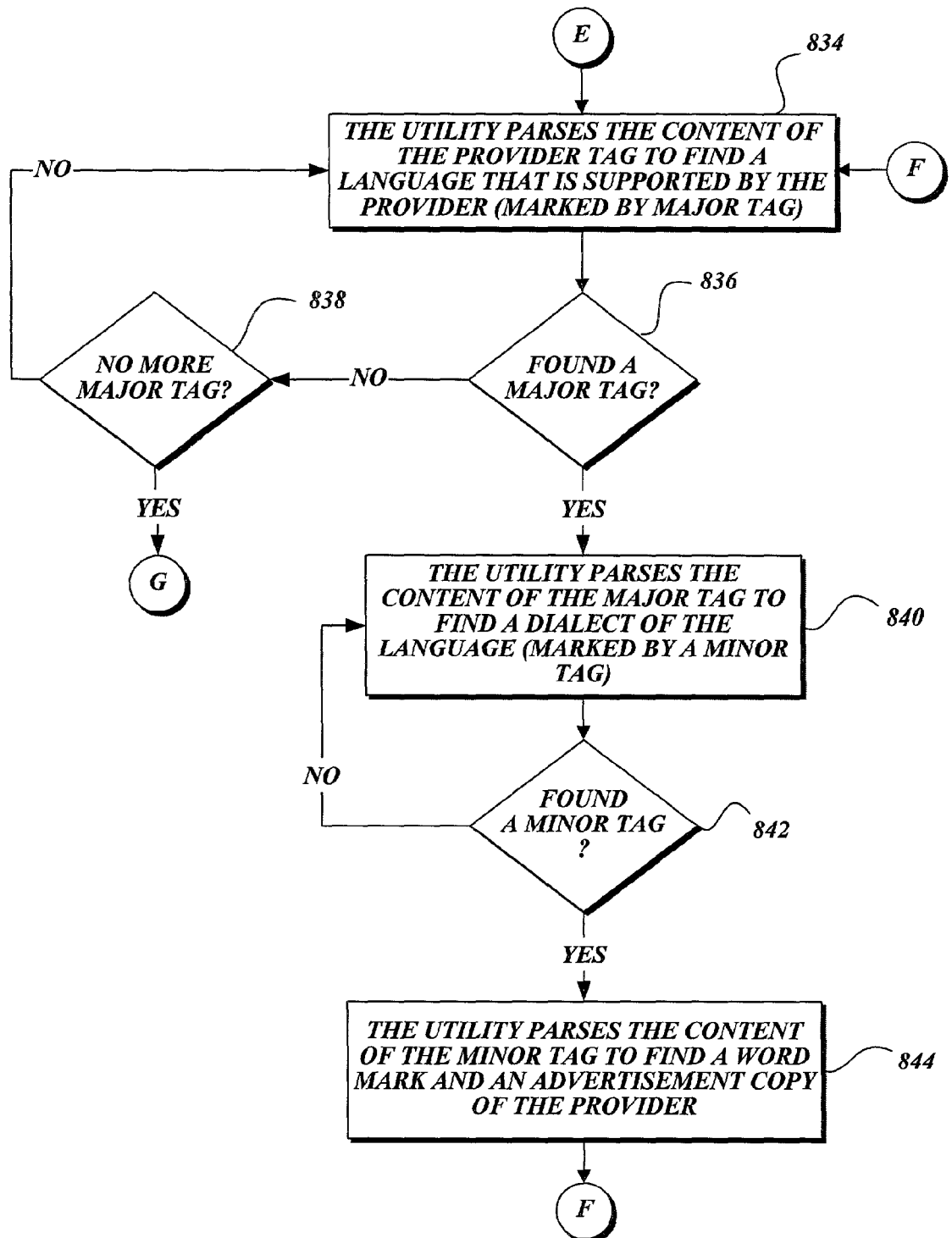
Figure 8F:
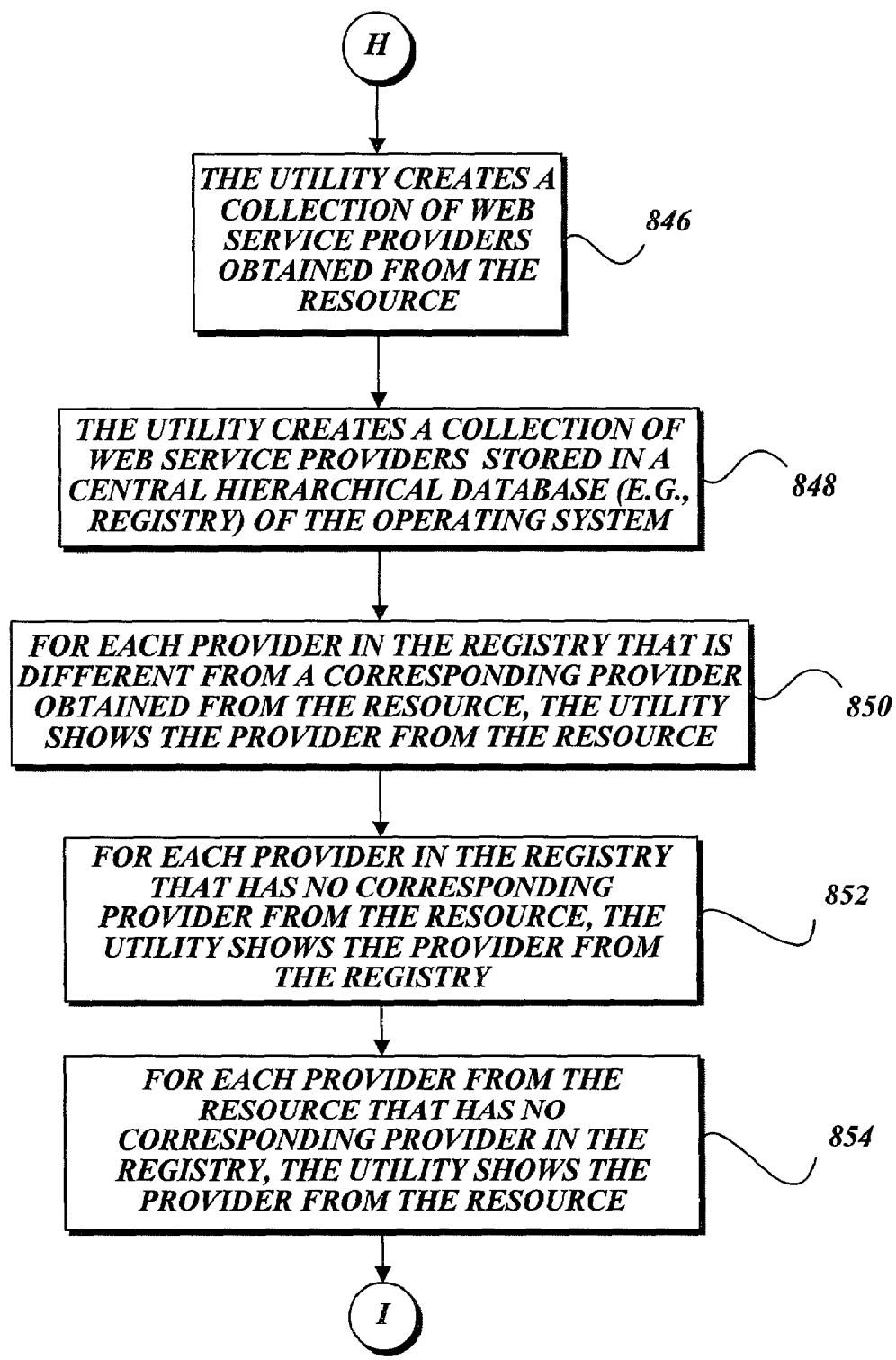

The organizational scheme of data structures 604A-608A stored on the resource 602 is illustrated in greater detail by a schema 700 shown in FIG. 7. The schema 700 is a structured framework formed from a customizable, tag-based language, such as extensible markup language (XML). Any suitable tag-based language can be used in accordance with this invention as long as such a language allows for customizable tags that describe and contain data.

The schema 700 includes one or more type tags 702A, which are indicative of a wizard type or a particular kind of Web service. A wizard of an appropriate type can process the contents between this corresponding type tag 702A and the ending type tag 702B. The type tag 702A includes a scope attribute 702A1. The scope attribute defines a string of text that further describes the kind of Web service that can be made available to a user.

Nesting inside the type tag 702A is a provider tag 704A and its corresponding provider ending tag 704B. There can be one or more provider tags 704A to indicate various Web service providers that can provide services of the type indicated by the type tag 702A. The provider tag 704A indicates a particular Web service provider that is available to market his services to a user in the geographic area defined by the operating system on which his wizard is being executed. The provider tag 704A includes a number of attributes, namely, a key attribute 704A1, icon attribute 704A2, and an address attribute 704A3. The key attribute 704A1 uniquely identifies the Web service provider from other Web service providers in the schema 700. The icon attribute 704A2 contains information relating to a symbol that distinctly identifies the Web service provider. The address attribute 704A3 identifies a location where the service provider can be found on the Internet, such as a uniform resource locator or URL.

Nesting within the provider tag 704A is a major tag 706A and its corresponding ending tag 706B. There can be one or more major tags 706A within the provider tag 704A. Each major tag 706A indicates a language that is supported by the Web service provider. Not shown in FIG. 7 is an attribute associated with the major tag 706A, which contains a hexadecimal code indicative of the language.

Nesting within the major tag 706A are one or more pairs of minor tags 708A, 710A. The pair of minor tags 708A, 710A indicate a dialect or a regional variety of the language. The minor tag 708A includes a word mark attribute 708A1, and content 708A2. A corresponding ending minor tag 708B marks the end of the minor tag 708A. The word mark attribute 708A1 indicates and describes textually the name of the Web service provider. The content 708A2 contains the word mark or description in the particular dialect defined by the minor tag 708A. The minor tag 710A includes content 710A2. A corresponding ending minor tag 710B indicates the end of the minor tag 710A. The advertisement copy attribute 710A1 textually describes the services being offered by the Web service provider. The content 710A2 is expressed in the dialect indicated by the minor text 710A.

FIGS. 8A-8F illustrate, in a process form 800, a protocol for exchanging Web service provider information between a utility, such as a wizard 604B, and a resource, such as the resource 602. For clarity purposes, the following description of the process 800 makes references to various elements illustrated in the schema 700 of FIG. 7, elements of the system 600 of FIG. 6, and elements of the wizard 500 of FIG. 5. From a start block, the process 800 proceeds to a block 802 where a user selects a task from the user interface of an operating system to process one or more files. These files can be images, music, text, or other data types. Next, at block 803, the selected task invokes a utility, such as the wizard 604B, that will guide the user through each step of the task. When the wizard 604B is invoked, it displays one or more files from which the user selects for processing by a Web service provider. See block 804.

Once one or more files have been selected by the user, the wizard 604B gets the identification of the geographic region stored in the operating system 604 at block 805. In Microsoft Windows, the identification of the geographic region includes the GEOID, which is a three-letter country code. The wizard 604B then issues to the resource 602 located on the Internet a request for a collection of Web services. See block 806. This request includes the GEOID. Next, the process 800 proceeds to a block 807 where the resource 602 parses the request to obtain the GEOID where the operating system 604 is in operation. Because the operating system 604 is in the USA, the GEOID is also "USA.". Here, the process 100 proceeds to a process continuation terminal ("terminal A")

From terminal A (FIG. 8B) the process 800 enters a block 809 where the resource 602 searches a number of customizable, tag-based data structures, such as extensible markup language (XML) data structures. Each data structure has a name with a base and a suffix. The base may comprise three letters and the suffix may comprise "xml" or other designations to indicate the language from which a data structure is formed. Next, at a decision block 811, the resource 602 decides whether there exists a data structure with a base that matches the GEOID. If the answer is NO, the process 800 proceeds back to the block 809 where it continues to search. If the answer at decision block 811 is YES, a block 810 is entered. At block 810, the resource 602 issues to the wizard 604B the found data structure 604A ("USA.XML") that describes the collection of Web services. Next, the process 800 proceeds to another continuation terminal ("terminal B").

From terminal B (FIG. 8D) the process 800 proceeds to a block 820 where the wizard 604B parses the data structure 604A to find a desired Web service type, which is marked by the type tag 702A. Next, the wizard 604B parses the content of the type tag 702A to find a Web service provider, which is marked by the provider tag 704A. See block 822. A test is made at decision block 824 to determine whether the wizard 604B has found a provider tag 704A. If the decision is YES, the process flow proceeds to a block 828 where the wizard 604B parses the provider tag 704A for the key attribute 704A1 that uniquely identifies the provider. The wizard 604B further parses the provider tag 704A for a reference to an icon file containing a symbol that identifies the provider (the icon attribute 704A2). See block 830. The wizard 604B yet further parses the provider tag 704A for the address attribute 704A3 where the information regarding the location of the provider on the Internet is provided. See block 832. Here, the process 800 enters another process continuation terminal ("terminal E").

From terminal E (FIG. 8E) the process 800 enters a block 834 where the wizard 604B continues to parse the content of the provider tag 704A to find a language that is supported by the provider. This is marked in the schema 700 by the major tag 706A. Next, at a decision block 836, the wizard 604B decides whether a major tag 706A has been found. If the answer is YES, the process 800 proceeds to a block 840 where the wizard 604B parses the content of the major tag 706A to find one or more dialects of the language marked by the minor tags 708A, 710A. Next, a test is made at decision block 842 to determine whether a minor tag has been found. If the decision is NO, the process flow proceeds back to the block 840 so that the wizard 604B can continue to find a dialect. Otherwise, the decision is YES, a block 844 is entered and the wizard 604B parses the content of the minor tag 708A to find a word mark and parses the content of another minor element 710A to find an advertisement copy of the provider. Both the word mark and the advertisement copy are expressed in the dialect of the language that is understandable to a user within proximity to the geographic region defined by the GEOID. From block 844, the process 800 proceeds to another continuation terminal ("terminal F").

From terminal F, the process 800 reenters block 834 to find an additional language that is supported by the provider. Next, at decision block 836, if the answer is YES, the previously discussed steps are followed. Otherwise, if the answer is NO, another decision block 838 is entered to determine whether there are no more major tags to find. If the decision is NO, the process flow proceeds back to block 834. Otherwise, the decision is YES, and the process 800 proceeds to another continuation terminal ("terminal G").

From terminal G (back to FIG. 8D), the process 800 proceeds to reenter block 822 where the wizard 604B attempts to find another Web service provider. At decision block 824, the wizard 604B decides whether it has found another provider tag 706A. If the decision is YES, previously discussed process steps are followed. Otherwise, if the decision is NO, another decision block 826 is entered where the wizard 604B decides whether there are any remaining provider tags to check. If this decision is NO, block 822 is reentered so that the wizard can find additional Web service providers. When there are no more provider tags to be checked, the answer to decision block 826 is YES, and the process proceeds to another continuation terminal ("terminal C").

From terminal C (back to FIG. 8B) the process 800 proceeds to a block 812 where the wizard 604B reconnects to the resource 602 and requests for one or more icon files containing symbols of Web service providers. The process 800 proceeds to another continuation terminal ("terminal D"). From terminal D (FIG. 8C) the process 800 proceeds yet to another continuation terminal ("terminal H").

From terminal H (FIG. 8F) the process 800 proceeds to a block 846 where the wizard 604B creates a collection of Web service providers obtained from the resource 602. The wizard 604B also creates a collection of Web service providers that are stored in the central hierarchical database 604C (e.g., Registry) of the operating system 604. See block 848. For each Web service provider in the central hierarchical database 604C that is different from the corresponding Web service provider obtained from the resource 602, the wizard 604B shows to the user only the Web service provider from the resource 602. See block 850. For each Web service provider in the central hierarchical database 604C that has no corresponding Web service provider from the resource 602, the wizard 604B shows to the user the Web service provider that is stored in the central hierarchical database 604C. See block 852. For each Web service provider from the resource 602 that has no corresponding Web service provider in the central hierarchical database 604C, the wizard 604B shows to the user the Web service provider from the resource 602. See block 854. From here, the process 800 proceeds to another continuation terminal ("terminal I").

From terminal I (back to FIG. 8C) the process 800 proceeds to a block 814 where the user selects a desired Web service provider and navigates the wizard 604B forward. For example, the user hits the Next button of the wizard 604B. The process flows to a block 816 where the wizard 604B stores the selected Web service provider in the central hierarchical database 604C. At block 818, the wizard 604B navigates the user to the first page of the selected Web service provider. From here, the process 800 ends.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an operating system for execution on a computer system, an interactive help utility for providing a collection of service providers on a display to a user so that the user may select a service provider, the interactive help utility comprising:
    a text box displaying instructions for the user to select a service provider;
    a set of navigation facilities; and
    a window displaying a collection of service providers, at least one service provider being dynamically retrievable from a remote resource based on at least a query to the operating system regarding a geographic region of the operating system and a conversion of a returned identification of the geographic region to a three-letter country code being stored in the operating system, wherein a service provider from the collection of service providers provides the ability to publish a file to a Web site.

2. The interactive help utility of claim 1, wherein a service provider from the collection of service providers provides the ability to order prints of pictures.

3. The interactive help utility of claim 1, wherein a service provider from the collection of service providers provides the ability to create a shortcut to shared folders or resources on a network, a Web site, or a server.

4. The interactive help utility of claim 1, wherein at least one of: a logo, a word mark, and an advertisement copy is displayed for each of said collection of service providers.

5. In an operating system for execution on a computer system, a computer-implemented method for exchanging information to obtain a collection of service providers for a utility to show the collection of service providers to a user so that the user may select a service provider, the method comprising:
receiving an indication from the user that the utility is invoked;
receiving an indication from the user that a file having content that is suitable for processing by a service provider is selected;
performing a query to the operating system to obtain an identification of a geographic region of the operating system and converting the identification to a three-letter country code; and
dynamically retrieving from a remote resource a collection of service providers, at least one service provider in the collection of service providers being presentable based on a service provider code being stored in the operating system and the three-letter country code, wherein dynamically retrieving includes retrieving a previously stored service provider in a central hierarchical database of the operating system.

6. The method of claim 5, further comprising displaying for each of said collection of service provider at least one of a logo of the service provider, a word mark of the service provider, and an advertisement copy of the service provider.

7. The method of claim 6, further comprising receiving an indication from the user that a service provider is selected, the service provider that is selected being defined as a selected service provider.

8. The method of claim 7, further comprising communicating with the selected service provider to obtain a user interface of the service provider with which the user interacts to use the selected service provider to process the file.

9. In an operating system for execution on a computer system, a computer-implemented method for exchanging information to obtain a collection of service providers for a utility to show the collection of service providers to a user so that the user may select a service provider, the method comprising:
issuing, by the utility to a resource located on a network, a request for a customizable, tag-based data structure that describes the collection of service providers, the request including an identification of a geographic region being stored in the operating system;
receiving, by the resource, the request for the data structure that describes the collection of service providers, wherein the data structure comprises at least a type tag having a provider tag, and in response, the resource converting the identification of the geographic region determined by the operating system into a three-letter country code; and
issuing, by the resource to the utility, the data structure that describes the collection of service providers on the basis of the three-letter country code and the provider tag, wherein the data structure having a nomenclature that is defined by a base and a suffix, the base being defined by the three-letter country code and the suffix specifying that the data structure is expressed by a customizable, tag-based language.

10. The method of claim 9, wherein issuing includes issuing, by the utility to the resource located on the wide area network, the request for the data structure by specifying a protocol to be used to access the resource; a name of a server on which the resource is located; and optionally, a path to the resource on the server.

11. The method of claim 9, wherein prior to issuing, by the utility to the resource located on the wide area network, the request for the data structure, the method further comprises getting the identification of the geographic region from the operating system.

12. The method of claim 9, wherein issuing includes issuing, by the resource to the utility, one or more icon files containing individually a symbol that identifies a service provider.

13. The method of claim 9, wherein issuing includes issuing, by the resource to the utility, the data structure that is capable of being stored on a computer-readable medium, the data structure comprising:
one or more type tags that are indicative of service providers of various kinds;
one or more provider tags that are indicative of service providers, the one or more provider tags being the contents of a type tag, each provider tag including a symbol attribute that iconically identifies a service provider and an address attribute that specifies where the service provider can be found on the wide area network;
one or more language tags that are indicative of languages used and understood by communities, the one or more language tags being the contents of a provider tag;
one or more dialect tags that are indicative of dialects, which are regional varieties of a language distinguished by linguistic features, the one or more dialect tags being the contents of a language tag; and
one or more textual tags that textually describe service providers, each textual tag containing a name of a service provider or an advertisement copy of the service provider, each textual tag being appropriate for a particular dialect of a particular language, each pair of text tags being the contents of a dialect tag.

14. The method of claim 13, further comprising creating a list of service providers, by the utility, as to show, for each service provider, at least one of the symbol attribute of a service provider providing the service, a name of the service provider, and an advertisement copy of the service provider.

15. The method of claim 14, further comprising receiving an indication from the user that a service provider is selected, and in response to the indication that the service provider is selected, the utility storing a provider tag in a central hierarchical database in the operating system, the central hierarchical database being used to store information to configure the operating system for one or more users, applications, and hardware devices, the stored provider tag being indicative of a service provider who is to provide the selected service.

16. The method of claim 15, wherein creating a list of service providers, by the utility, includes using stored provider tags in the central hierarchical database in the operating system unless superseded by corresponding provider tags obtained from the resource located on the Internet.

17. The method of claim 15, wherein creating a list of service providers, by the utility, includes using stored provider tags in the central hierarchical database in the operating system even if corresponding provider tags no longer exist on the resource located on the Internet.

18. A computer-readable storage medium having a customizable, tag-based data structure stored thereon for use in dynamically providing a collection of service providers to an interactive help utility, the data structure comprising:

one or more type tags that are indicative of service providers of various kinds, the one or more type tags comprise a scope attribute that defines a string of text describing the kind of service provider available;

one or more provider tags that are indicative of service providers, each provider tag including a symbol attribute that iconically identifies a service provider and an address attribute that specifies where the service provider can be found on the Internet;

one or more major tags that are indicative of languages used and understood by communities, peoples, and nations, wherein each major tag has one or more minor tags that are indicative of a particular dialect of the major tag, and wherein the major and minor tags having a nomenclature that is defined by a base and a suffix, the base being defined by a three-letter country code and the suffix specifying that the data structure is expressed by a customizable, tag-based language; and one or more textual tags that textually describe service providers, each textual tag containing a word mark of a service provider or an advertisement copy of the service provider, each textual tag being appropriate for a particular language and describing a service in a dialect of the particular language.

19. The data structure of claim 18, wherein each provider tag being the contents of a type tag, wherein each major tag being the contents of a provider tag, wherein each minor tag being the contents of a major tag, and wherein each provider tag being the contents of a type tag.

20. The data structure of claim 19 being configured to be sent from a resource on the Internet to the interactive help utility running on an operating system so that the interactive help utility may create a list of service providers and present the list of service providers to a user for selection.

* * * * *